No. 618,284. Patented Jan. 24, 1899.
A. O'BRIEN.
SANITARY APPLIANCE.
(Application filed Sept. 27, 1897.)
(No Model.)
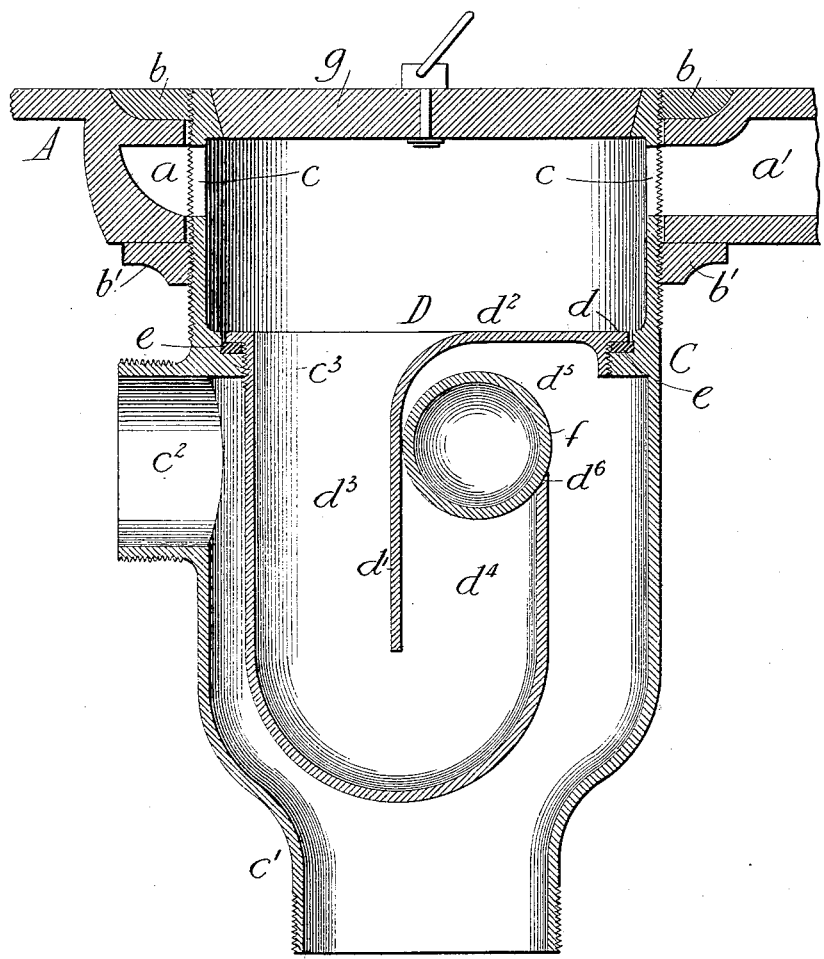
WITNESSES
INVENTOR
Arthur O'Brien
By his Attorneys

UNITED STATES PATENT OFFICE.

ARTHUR O'BRIEN, OF HELENA, MONTANA, ASSIGNOR OF ONE-HALF TO AUGUST FACK, OF SAME PLACE.

SANITARY APPLIANCE.

SPECIFICATION forming part of Letters Patent No. 618,284, dated January 24, 1899.

Application filed September 27, 1897. Serial No. 653,145. (No model.)

*To all whom it may concern:*

Be it known that I, ARTHUR O'BRIEN, a citizen of the United States, residing at Helena, in the county of Lewis and Clarke and State of Montana, have invented certain new and useful Improvements in Sanitary Appliances; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention is directed to improvements in that class of sanitary appliances which are adapted for application to bowls, sinks, bath-tubs, cesspools, and the like, and has for its object the production of an improved sealing device by the operation of which backwater and the escape of gas and other vapors are effectually checked.

The nature of my improved sanitary appliance will be understood from a reading of the following description and a reference to the accompanying drawing, in which is shown a sectional view of my improved sanitary appliance.

Referring to the drawing by letter, A denotes a portion of a bowl, sink, or the like provided around its opening with a depression for the reception of a nut $b$, which supports the appliance, the upper surface of the said nut being, when in place, flush with the bowl, as shown. The bowl is also provided with an annular overflow-chamber $a$, from which extends an overflow-passage $a'$.

C is a casing the upper end of which occupies the opening of the bowl and is exteriorly threaded for engagement with the nut $b$. At $c\ c$ in said casing are openings which establish communication between the overflow chamber and passage and the interior of the casing.

$b'$ is a nut which engages the exteriorly-threaded portion of the casing and in practice is screwed tightly against the under side of the bowl, and thereby coöperates with the nut $b$ to securely fasten the casing to place.

The lower portion $c'$ of the casing is preferably reduced in diameter for connection with the waste-pipe, the exterior side being screw-threaded to permit of the attachment.

At $c^2$ is an exteriorly-threaded extension, to which is connected the back vent-pipe.

The casing is provided in its interior with an annular flange $c^3$, which is screw-threaded, as shown, to permit of the rigid connection therewith of a trap D, the upper portion of which is screw-threaded to engage said flange. Beyond the threaded portion of the trap is an annular flange $d$, and interposed between the flanges $d$ and $c^3$ is a gasket $e$ to provide a tight joint. The lower portion of the trap is of smaller diameter than the upper portion and is eccentric to the latter, as shown, for a purpose presently to be explained. Centrally of the trap is the usual partition $d'$, which terminates at a point above the bottom of the trap. A portion of the trap is covered by a top plate $d^2$, which plate terminates at the downward passage $d^3$ of the trap, where it is curved, as shown, and joins the partition $d'$. In the outer wall of the upward passage $d^4$ of the trap is an opening $d^5$, which terminates at the under side of the top plate $d^2$. The lower side $d^6$ of this opening $d^5$ is beveled inwardly and coöperates with the partition $d'$ to provide a seat for a ball-float $f$, the diameter of which is in excess of the diameter of the passage $d^4$. This ball-float may, however, be dispensed with. As before stated, the lower portion of the trap is of smaller dimension than the upper portion and is eccentric to the latter. This arrangement allows of a slight lateral movement of the ball-float, and the lower side $d^6$ of the opening is so spaced with relation to the top plate as that the float can be raised vertically; but this vertical and lateral range of movement is sufficient only to allow of the waste water passing the float when the latter is raised from its seat and insures the automatic seating of the float by gravity when the flow of waste water has ceased. The float is therefore normally seated, and its normal position is restored immediately upon the cessation of the passage of the waste water. Thus the float forms a constant back seal against the escape of gas and other vapors from the sewer or drain. In the event of backwater the flooding of the bowl is effectually prevented by the action of the float, which is forced tightly to its seat by the backwater and checks the flow. The casing is provided with a plug $g$, which may be of usual construction.

I claim as my invention—

1. In combination with a bowl or the like having an opening, a casing fitted to said opening and provided with threaded extensions for connection with a waste-pipe and a back vent-pipe and having an interior flange, a trap flanged at its top and supported by the casing-flange, and a top plate covering the upward passage of the trap, substantially as described.

2. In combination with a bowl or the like having a depression around its opening, a casing fitting said opening and provided with securing-nuts, the upper nut fitting said depression, said casing having threaded extensions for connection with a waste-pipe and a back vent-pipe, and having an interior flange, a trap flanged at its top and supported by the casing-flange, a top plate covering the upward passage of the trap and a ball-float in said passage.

In testimony whereof I affix my signature in presence of two witnesses.

ARTHUR O'BRIEN.

Witnesses:
J. W. BURTON,
GEO. E. BAYHA.